United States Patent [19]
Arnold

[11] Patent Number: 5,199,028
[45] Date of Patent: Mar. 30, 1993

[54] ASYNCHRONOUS TIME DIVISION NETWORK

[75] Inventor: John S. Arnold, Northants, England

[73] Assignee: BEC Plessey Telecommunications Limited, Coventry, England

[21] Appl. No.: 336,158

[22] Filed: Apr. 11, 1989

[30] Foreign Application Priority Data

Apr. 28, 1988 [GB] United Kingdom ............. 8810094

[51] Int. Cl.$^5$ ............................................. H04Q 11/04
[52] U.S. Cl. ................................. 370/60; 370/94.3
[58] Field of Search ................... 370/60, 60.1, 58.1, 370/58.2, 58.3, 94.1, 94.2, 94.3, 85.6; 340/825.5, 825.51, 825.79, 825.8, 825.83

[56] References Cited

U.S. PATENT DOCUMENTS 4,797,882  1/1982  Maxemchuk ..................... 370/60
4,817,082  3/1989  Orsic .......................... 340/825.79
4,864,558  9/1989  Imagawa et al. ................ 370/60

FOREIGN PATENT DOCUMENTS 8401868  5/1984  World Int. Prop. O. .
8602510  4/1986  World Int. Prop. O. .

OTHER PUBLICATIONS

John J. Kulzer, et al. Statistical Switching Architectures for Future Services, ISS '84 Florence, May 7–11, 1984.

Primary Examiner—Douglas W. Olms
Assistant Examiner—Wellington Chin
Attorney, Agent, or Firm—Fleit, Jacobson, Cohn, Price, Holman & Stern

[57] ABSTRACT

The asynchronous time division network transmits data by way of high rate bearers. The data is divided into fixed length packets. The network comprises a switching matrix having a number of input and output ports arranged in columns. Each data packet is routed from an input port to a defined output port via addressed switching nodes. Each node has a queueing means, and each queueing means of each output column is tested and priority is given to the first queueing means tested which holds more than one packet.

6 Claims, 4 Drawing Sheets

ASYNCHRONOUS TIME DIVISION NETWORK

FIELD OF THE INVENTION

The present invention relates to an asycnchronous time division network wherein data is divided into fixed length packets which are transmitted by way of high rate bearers.

BACKGROUND OF THE INVENTION

In a known form of circuit switched TDM multiplex a particular circuit is identified from all others by imposing a frame and counting the slots from the start of the frame. This implies that the circuit rate is a fixed and exact proportion of the bearer rate; therefore the system is synchronous. In such systems small differencesin rate (plesiochronous operation) can be handled by either occasionally deleting or repeating a sample carried in a slot or by providing a bearer nominally above the synchronous rate and padding the frame to fit.

In a known asynchronous time division network discussed in U.S. Pat. No. 4,491,945 a technique of rotating the destination address is used, so that the two most significant bits of the address are always presented to the next succeeding switch node.

For an asynchronous time division network there is no frame and each packet carries its own identification and, provided the bearer rate is sufficient to give a very low probability of packets being lost due to queue overflow, there need not be a synchronous relationship.

In this type of network modest sized switch elements can be used, for example 8×8, but a disadvantage is that queues are needed at each switch element input port.

The network carries packets for two basic types of virtual circuit. There are STREAM circuits equivalent to a conventional circuit switched service, and BURST circuit carrying bursty data. In the latter case it may be assumed that an embedded protocol is provided to acknowledge 'data packets' (corresponding to a contiguous group of switch packets) and providing a repeat facility if 'data packets' are incorrectly received. Also, in the case, relatively long queueing delays are acceptable. If the bearers and ports are loaded with up to, say, 55% of STREAM traffic and STREAM packets are given first priority of access then BURST services can be offered access using the remaining capacity. In this way much higher loadings may be achieved, at least on the output ports. Providing first priority access to STREAM services in a single plane switch will give some improvement; however, if a single queue is used at the input ports and the packet at the head of the queue is a BURST packet, following STREAM packets will be blocked. A greater improvement is achieved by providing two input queues, one for STREAM packets (with first priority access) and the other for BURST packets. The BURST packet queue can also be made longer to allow for transient conditions. For a multistage switch a further modest improvement can be achieved by routing STREAM and BURST data through separate switch planes. This improvement results because the loading on inter-stage bearers is substantially reduced. Almost all the loss then occurs at the access point to the common output port bearer. In this case also the loss on STREAM services is negligibly small, almost all loss occurs on BURST packets.

The above solution suffers from the disadvantage that, when more than one input port wishes to send a packet to the same output port at the same time only one can succeed, thus packets further back in the queue may be blocked from free output ports. This problem can be resolved by providing a very short queue at each crosspoint of the switch matrix. Packets are then loaded from the input queue into the relevant crosspoint queue and output bearers will normally have one or more packets waiting to be transmitted on that bearer. The combination of a two plane switch with two packet crosspoint queue permits loadings of more than 80% assuming 70% STREAM and 30% BURST traffic.

A queueing algorithm is therefore required to take note of packets further back from the head of the queue. The further back the algorithm looks, the higher the achievable occupancy of the destination bearer.

STATEMENT OF THE OBJECTS OF THE INVENTION

Accordingly, an aim of the present invention is to provide an asynchronous time division network which include an efficient queueing means over those known in the prior art.

According to the present invention there is provided an asynchronous time division network in which data is divided into fixed length packets which are transmitted by way of high rate bearers, the network comprising a switching matrix having a plurality of input ports and a plurality of output ports, arranged in columns and means is provided for routing each data packet from an input port to a defined output port by way of a plurality of individually addressed switching nodes, each node being provided with queueing means, and each queueing means in each output column of the switching matrix is tested whereby priority is given to the first queueing means tested which holds more than one packet.

BRIEF DESCRIPTION OF THE DRAWINGS

An embodiment of the present invention will now be described with reference to the accompanying drawings wherein.

DESCRIPTION OF THE PREFERRED EMBODIMENT

Connections through the network are established as virtual circuits using by-path signalling, for example CCITT No 7 signalling. A virtual circuit is a non-physical circuit between source and destination represented by recognition of the packet header at each node and a predicted statisticated allowance for the channel characteristics on bearers along the route.

Figure 1:
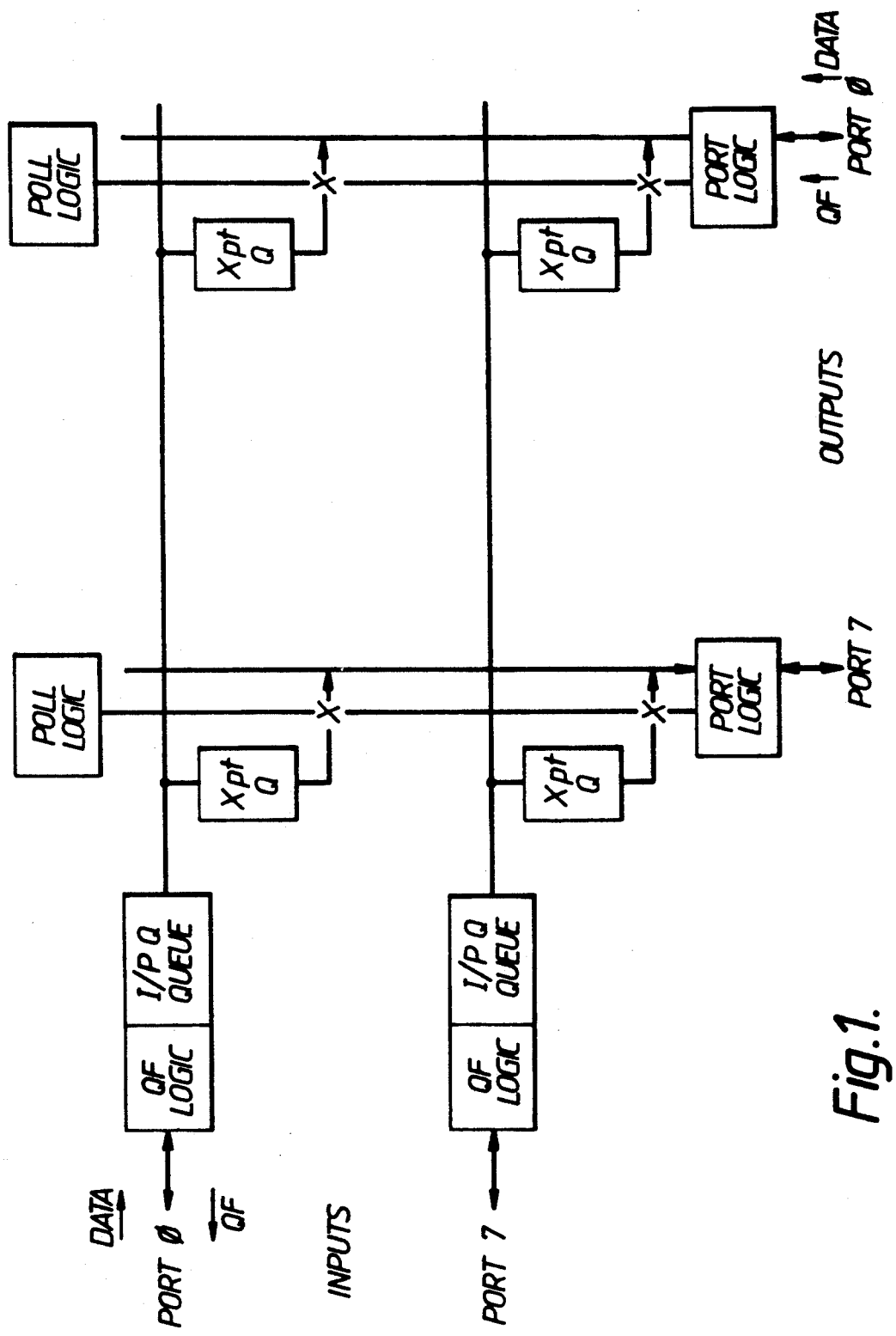
FIG. 1 shows an 8×8 switching element.

The switching element is shown in FIG. 1, and is an 8×8 array with at least a two-packet queue (Q) at each crosspoint (XPT). The elements will also provide, for example, a sixteen-packet input queue (IPQ). Each input line will allow for a reverse direction slot to indicate the Input Queue Full condition.

The element carries out the following operations in parallel on each port:

Test of the input queue status; 'Queue Full' (QF) response if full or load queue if not full.

Test crosspoint queue addressed by leading packet of input queue; if not full transfer packet to crosspoint queue.

Test crosspoint queues in each output column of the switch matrix starting from the row after the last one transmitted from in that column. First priority is given to the first crosspoint queue tested holding more than on packet, else the first crosspoint queue holding one packet. This process must be very rapid, a gap is allowed in the output format of 2 bit periods to complete this test which must therefore be asynchronous. This gap corresponds to the period allowed for the 'Queue Full' response from the next stage. The packet is transmitted if the following input queue is not full, and the 3-bit address of the output port is added to te end of the packet.

A typical solution for the testing of the crosspoint queues serving one output is to poll the queue logic whilst output is in progress.

Each queue provides three indications to the polling logic:
Single cell present,
More than one cell present,
No cells present.

In each case a cell being input to the queue is included and a cell being output from the queue is not included.

The polling sequence is up to two cycles of the input ports.

The first queue addressed with more than one cell present is accepted immediately and the polling sequence is stopped.

After one cycle of the ports the first queue addressed with a single cell present is accepted and the polling sequence is stopped.

After two cycles of the ports, if no queue is accepted the 'true' indication will be transmitted in the new slot.

The polling sequence will start from the position where the last sequence stopped thus ensuring equality of access for all ports.

Figure 2:
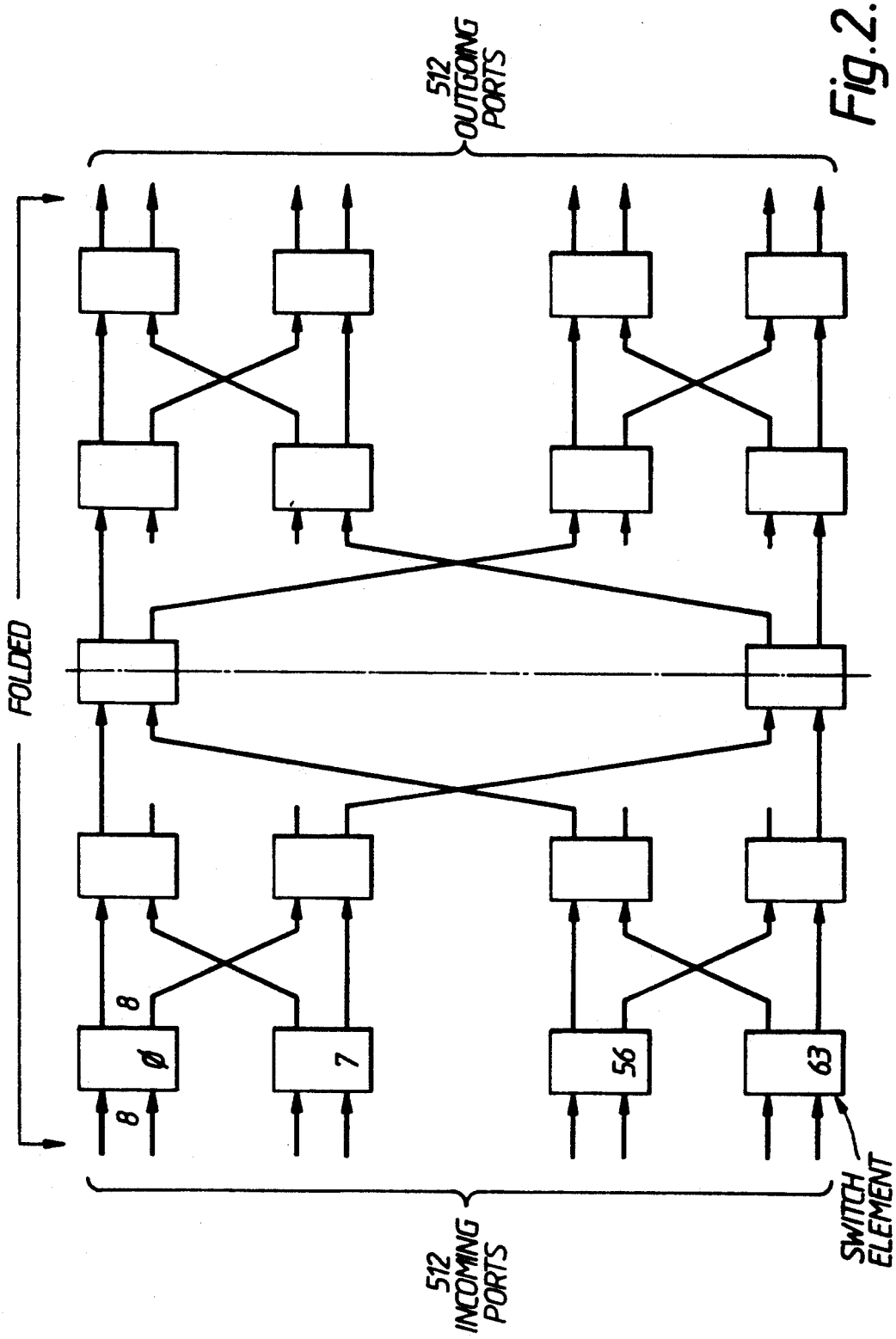
FIG. 2 shows a typical configuration for a 512 port switch.

FIG. 2 shows a typical configuration of known form for a 512 port switch, composed of a number of switch elements as shown in FIG. 1, interconnected to form a switching matrix.

Figure 3:
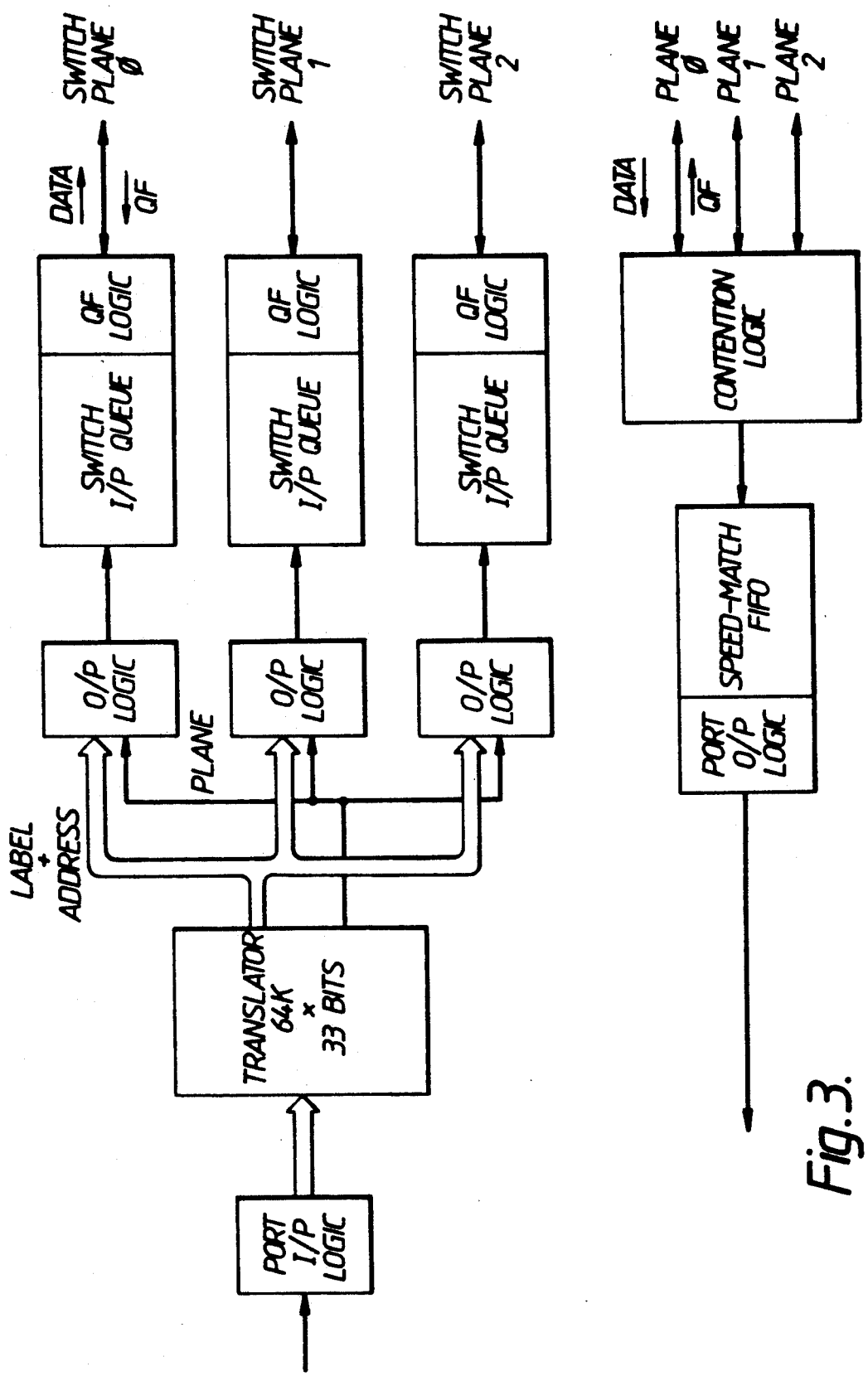
FIG. 3 shows an asynchronous time division digital line terminator.

Referring to FIG. 3, a line terminator is shown, in which a translator translates the label on incoming packets received on the port input logic. The label is translated into a new label for the outgoing packet. The translator also provides routeing digits in the form of an address which are accepted by successive switching stages. The translator also selects one of three switch planes, and connections to the planes are made by way of respective output logic circuits to the respective switch input queue and queue full logic of the addressed switch element.

In the reverse direction, contention logic receives the data from the switching planes which is passed through a speed-match first in first out buffer before dispatch by way of the port output logic.

Figure 4:
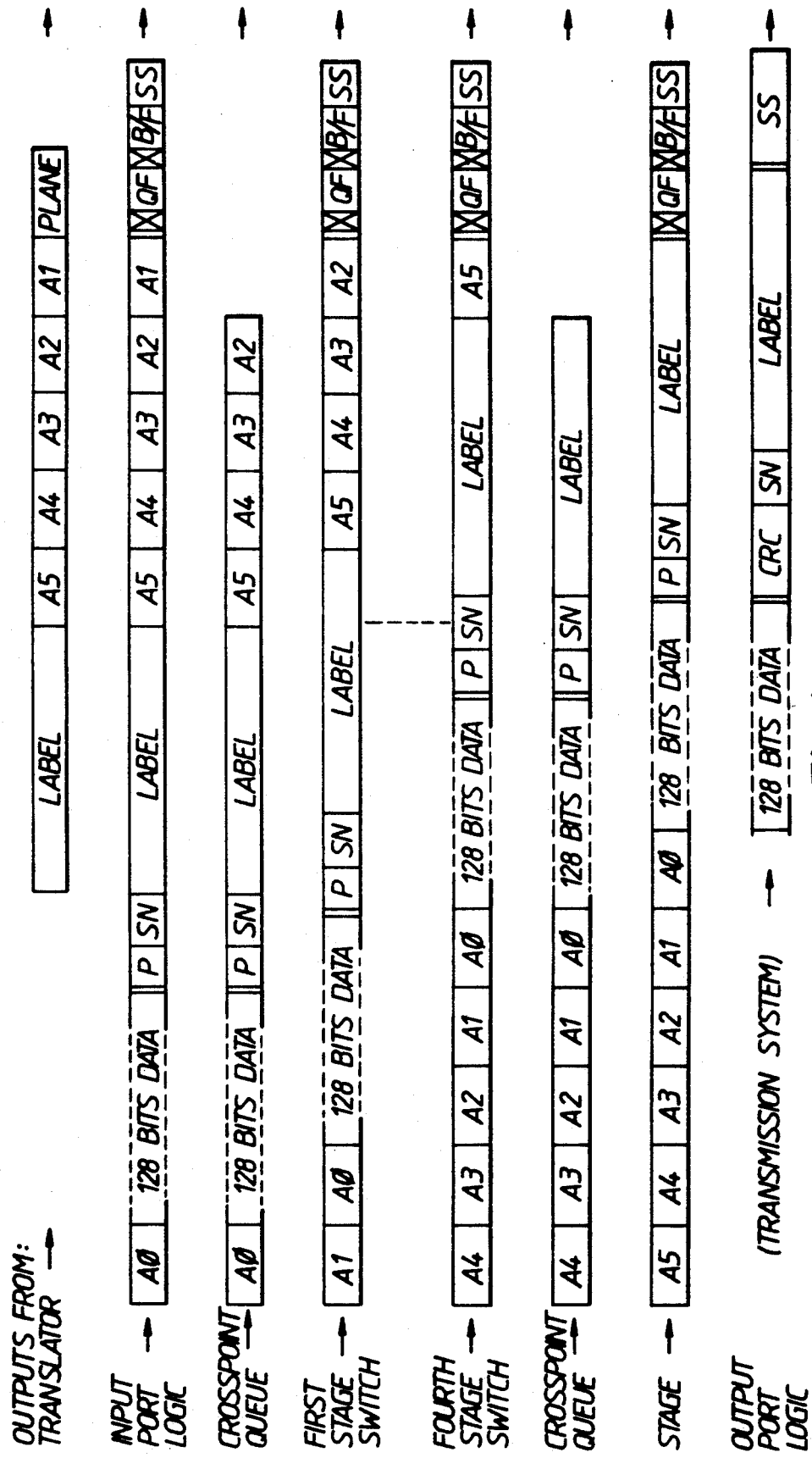
FIG. 4 shows the sequential packet formats for a 5-stage switch.

The sequential packet formats for a 5-stage switch are shown in FIG. 4.

The LABEL field in the header of an incoming packet is used to address a TRANSLATOR FIG. 3, the output of which is a new LABEL to be used in the packet on the destination bearer, and a series of address fields for routeing the packet through the switch. For a 5-stage switch, five 3-bit ADDRESS fields are needed, A1 through A5. Using a conventional switch configuration, fields A3 through A5 will uniquely identify the destination bearer whilst A1 and A2 provide for alternative paths for the virtual circuit through the switch. The LABEL and ADDRESS fields are set up by the control system when a virtual circuit is established. The TRANSLATOR also holds a field identifying one of three switch planes (0, 1, 2) FIG. 3. The planes are provided both for traffic and security reasons.

The output from the port logic is a packet in a standard format recognised by the switch elements. The transmission line is slotted and a slot may be in use (busy) or unused (free). A BUSY/FREE (B/F) bit is therefore needed at the front of the header. In addition a SLOT START (SS) bit is provided. This bit contains a multi-slot pattern which is used, not to synchronise the slot since a separate slot start clock would be provided, but to confirm the start position as an extra precaution.

The following 2-bits are used to transmit a QUEUE FULL (QF) indication in the reverse direction on the same line. These lines therefore have bi-directional ports at each end. The QUEUE FULL bit is buffered by a half bit either side to allow for timing tolerances.

The next 3-bits contains the address (A1) for the output port of the first stage of the switch and is followed by A2 through A5. Next is the 16 bit LABEL which is not required by the switch, followed by a 2-bit SEQUENCE NUMBER (SN). The sequence number is used at the terminal to recognise the loss of a pocket. This is followed by a PARITY bit (P) over the address fields, label and SN. The P bit completes the header but, after the 128-bit DATA field, A$\phi$ is added. This is the input port of the first stage switch element and, together with A1 to A5, will allow the input port to be identified at the output port. This information may be used by the control system to identify 'bad' paths through the switch and may result in a change of the plane value in the TRANSLATOR output. All the data from A1 at the start of the packet to A$\phi$ at the end are entered into the input packet queue of the switch element if the queue is not full.

In parallel with the above operation, the first 3 bits (A1) in the leading packet of the switch element input queue are read out and used to address the crosspoint queue. If the queue is not full the following fields (A2 to A$\phi$) are loaded into the queue. A queue status field is set according to the resultant status, which may be QUEUE EMPTY, ONE PACKET, >ONE PACKET or QUEUE FULL (for a 2-packet queue where >ONE PACKET corresponds to QUEUE FULL, the latter is used).

In parallel with the above operations and if at least one of the crosspoint queue status fields in the column is not QUEUE EMPTY, the SS bit followed by BUSY is transmitted on the switch element output port. During the next two bits two parallel operations take place. The QF bit is read from the 'output' port and the crosspoint queue status bits in the column are asynchronously polled. Polling starts from the row after the last row sent and first priority is given to a queue with the status >ONE PACKET or QUEUE FULL. If the incoming QF bit was zero then the first packet in the selected crosspoint queue is transmitted and the port address field (A1 for the first stage) is appended to the end of the transmission.

The above operations occur simultaneously at all input and output ports of the switch element.

At the switch output port logic, inputs are received from all switch planes. The planes are given a fixed priority order thus the final stage switch element of a lower priority plane may receive a 'QF' indication which in this case means that a packet from a higher priority has been selected.

The switch address fields are redundant in the transmitted packet, therefore this packet is shorter, implying that the in-switch packets are clocked at a higher rate. Speed matching is achieved via a FIFO and the packet comprises, for example, a 3-bit SLOT SYNCHRONISATION field which, unlike the 1-bit field in the switch, is used to determine slot start. This is followed by the 16-bit LABEL which is used at the terminating end of the link to determine the virtual circuit, followed by the 2-bit SN, a 3-bit CRC and the 128-bit data field. In this case a free slot would be identified by the allzeroes code in the LABEL field.

SWITCH SECURITY

At least two switch planes are needed to carry STREAM or BURST type virtual circuits with the higher priority given to STREAM. If one of the two planes failed then it could be possible to offer all traffic to the one remaining plane. An integrated solution using three planes with descending order of priority at the output ports of the switch offers a satisfactory solution. Using the parity check over the header (including free slots), errors can be detected in the output port logic. An error message may then be sent to the control including the fields A0 to A5 which identify the source port and the path through the switch. A control decision can then be taken to change the plane for that virtual circuit by changing the PLANE field in the incoming port TRANSLATOR. The Parity bit and CRC are provided only over the header.

Errors in the data in the header will result in a packet being sent to the wrong destination, which can have serious effects on a connection.

Errors in the data field for STREAM connections may not affect performance as much as deletion of the packet, e.g. a single error over 16 speech samples would probably not be noticed but loss of 16 samples would result in a noticeable 'click'. The terminal protocol for BURST connection includes an embedded CRC.

The check over the header only is adequate for performance analysis if it is assumed that packets are transmitted serially within and external to the switch, so that the data field and header both use the same hardware.

The above description is one example of implementing the invention, and is not intended to limit the scope of the invention. It will be readily understood for example that alternative forms of signalling can be used, different queueing techniques may be used, and different switching matrix sizes may be used.

I claim:

1. An asynchronous time division network in which data is divided into fixed length packets which are transmitted by way of high rate bearers, the network comprising a switching matrix of switching nodes, the matrix having a plurality of input ports and a plurality of output ports, said plurality of output ports each being connected at one end of respective columns formed by the switching nodes and means is provided for routing each data packet from a respective one of the plurality of input ports to a defined one of the plurality of output ports by way of a plurality of the individually addressed switching nodes, each node being provided with queuing means and each queuing means in each column of the switching matrix being tested starting from a row after a last row transmitted from that column whereby priority is given to the first queuing means determined to hold more than one packet on testing.

2. An asynchronous time division network as claimed in claim 1, wherein incoming packets of data have a label appended to the data and a translator at each output port is arranged to translate the label appended to the incoming packet of data, into a new label appended to an outgoing packet of data.

3. An asynchronous time division network as claimed in claim 2, further comprising a succession of switching stages, each stage comprising a number of switching matrixes, wherein the translator generates routing digits in the form of an address accepted by the succession of switching stages.

4. An asynchronous time division network, comprising three networks, each as claimed in claim 3, each of the three networks forming a switch plane, wherein the translator is arranged to select one of the three switch planes and connections to the planes are made by way of the respective output logic circuits, respective switch input queues and respective queue full, logic circuits.

5. An asynchronous time division network as claimed in claim 4, wherein data received from the switching planes is passed to the respective output port by way of a contention logic circuit and speed-match first-in first-out store.

6. An asynchronous time division network as claimed in claim 1 or 5 wherein each queueing means comprises a status indicator which is polled during testing and priority given to a queue having more than one packet of data or a full queue.

* * * * *